(12) United States Patent
Morin

(10) Patent No.: US 10,890,535 B2
(45) Date of Patent: Jan. 12, 2021

(54) PAINT SYSTEM FAULT DETECTION

(71) Applicant: GM GLOBAL TECHNOLOGY OPERATIONS LLC, Detroit, MI (US)

(72) Inventor: Daniel Morin, Dallas, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/424,296

(22) Filed: May 28, 2019

(65) Prior Publication Data

US 2020/0378897 A1 Dec. 3, 2020

(51) Int. Cl.
*G01N 21/85* (2006.01)
*G01N 21/27* (2006.01)
*G01N 21/25* (2006.01)

(52) U.S. Cl.
CPC ........... *G01N 21/85* (2013.01); *G01N 21/251* (2013.01); *G01N 21/255* (2013.01); *G01N 21/27* (2013.01); *G01N 2201/08* (2013.01); *G01N 2201/12* (2013.01)

(58) Field of Classification Search
CPC ...... G01N 21/85; G01N 21/251; B05B 12/14; B25J 11/0075; G05B 2219/45013; B01F 2215/005
See application file for complete search history.

(56) References Cited

U.S. PATENT DOCUMENTS

| | | | |
|---|---|---|---|
| 5,169,262 A * | 12/1992 | Wilson | E01C 23/163 404/84.05 |
| 6,195,443 B1 * | 2/2001 | Hammond | G01N 21/85 356/73 |
| 2015/0029813 A1 * | 1/2015 | Berghaus | B01F 15/00214 366/140 |

* cited by examiner

*Primary Examiner* — Maurice C Smith

(57) ABSTRACT

Example apparatuses and methods are provided for detecting a fault in a painting system. A fluid supply line such as a paint line or isolation line may have an outer wall formed of a material which permits light to be transmitted through the outer wall. First and second optical conduits may be provided, which are configured to transmit an optical signal through the outer wall and receive a reflected optical signal, respectively. An optical sensor may be in communication with the second optical conduit such that the optical sensor is configured to receive the reflected optical signal. A fault in the fluid supply line, e.g., traces of a previous color paint, air bubbles, or other contaminant, may be detected based upon a comparison of the received optical signal with the optical signal transmitted through the first optical conduit.

20 Claims, 3 Drawing Sheets

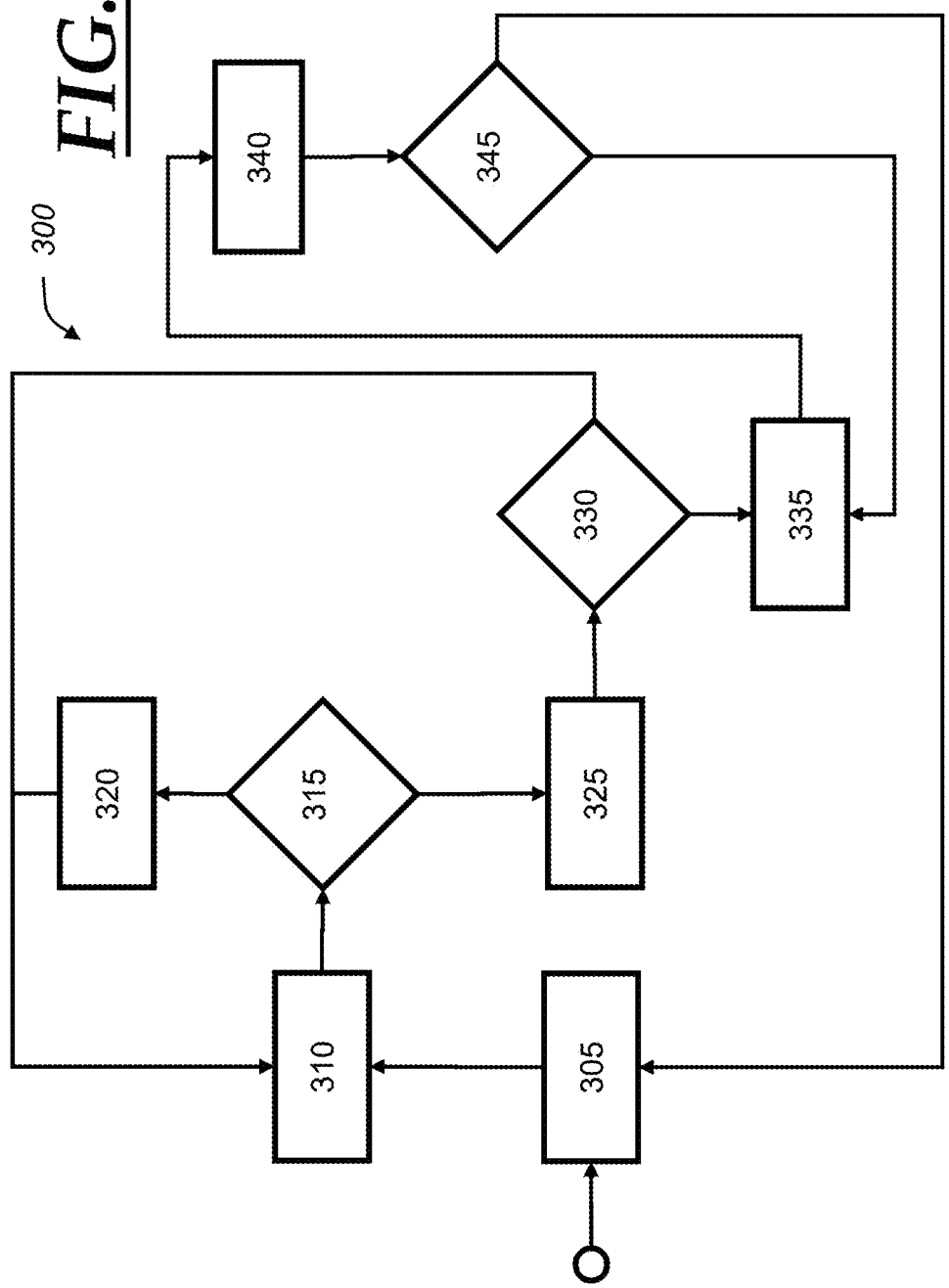

PAINT SYSTEM FAULT DETECTION

INTRODUCTION

Painting systems for automobiles or vehicles typically are capable of applying multiple different colors through an applicator. For example, a painting system may apply paint in a first color to one or more vehicles, and subsequently apply a different color paint to other vehicles.

Painting systems typically circulate water or a cleaning solvent through the applicator and associated hoses, conduits, and other components that come into contact with paint in between applications of different color paints. It is desired to thoroughly flush the application components of all traces of the previous paint color before beginning painting with a different color, as small traces of different color paint can create specks or other visual defects in the paint applied to the vehicle. It is also desired to prevent accumulation of air bubbles in painting lines of a painting system, as these can also cause visual defects in paint applied to a vehicle.

Known color changing processes and painting systems lack the ability to adequately detect contamination and other faults in the system. As a result, problems may arise during painting or color change cycles, e.g., due to a valve not properly seating due to contamination. Moreover, such contamination creates quality defects in the applied paint.

Accordingly, there is a need for an improved painting system that addresses the above shortcomings.

SUMMARY

In at least some example illustrations, an apparatus for detecting a fault in a painting system is provided. A painting system may include an applicator configured to apply paint to a series of objects and a paint block assembly configured to receive a plurality of paint valves corresponding to different paint colors applied by the applicator. The apparatus may have an isolation line configured to supply a current selected color paint to the applicator. The isolation line may have an outer wall formed of a material that is at least partially transparent such that light is permitted to be transmitted through the outer wall. The apparatus may further include a first optical conduit configured to transmit an optical signal through the outer wall, and a second optical conduit configured to receive a reflected optical signal generated by passing the optical signal through the isolation line. The apparatus may also include an optical sensor in communication with the second optical conduit such that the optical sensor is configured to receive the reflected optical signal, and a processor in communication with the optical sensor. The processor may be configured to detect a previous color paint in the isolation line based upon a comparison of the received optical signal with the optical signal transmitted through the first optical conduit.

In some examples, the processor is configured to detect the previous color paint based upon a diminished intensity of the received optical signal established from the comparison of the optical signal with the received optical signal.

In at least some example approaches, at least one of the first and second optical conduits is a fiber optic cable.

Some example apparatuses may further include a signal amplifier in communication with the optical sensor.

The processor, in some example apparatuses, may be configured to establish a threshold amplitude for the received optical signal to be used to determine or establish the presence of the previous color paint. In these examples, a received amplitude of the received optical signal may be compared with the threshold amplitude.

In some examples, the processor may be configured to establish the presence of the previous color paint based upon a reduction in amplitude of the received optical signal compared with the optical signal transmitted through the first optical conduit.

Other example apparatuses are provided for detecting a fault in a painting system having an applicator configured to apply at least two different color paints to objects. The apparatus may include a fluid supply line configured to supply one of a paint and a solvent to the applicator. The fluid supply line may have an outer wall formed of a material, the material being at least partially transparent such that light is permitted to be transmitted through the outer wall. The apparatus may further include a first optical conduit configured to transmit an optical signal through the outer wall and a second optical conduit configured to receive a reflected optical signal generated by passing the optical signal through the fluid supply line. The apparatus may also include an optical sensor in communication with the second optical conduit such that the optical sensor is configured to receive the reflected optical signal, and a processor in communication with the optical sensor. The processor may be configured to detect a fault in the fluid supply line based upon a comparison of the received optical signal with the optical signal transmitted through the first optical conduit.

In at least some of these example apparatuses, the processor is configured to detect the fault based upon a diminished intensity of the received optical signal established based upon the comparison of the optical signal with the received optical signal.

Alternatively, in other example approaches the processor is configured to detect the fault based upon an intensity of the received optical signal exceeding a threshold intensity.

Example apparatuses may detect faults including, for example, a presence of a previous paint circulated in the fluid supply line, or a presence of air in a current paint in the fluid supply line.

In at least some example apparatuses, at least one of the first and second optical conduits is a fiber optic cable.

Some example apparatuses may further include a signal amplifier in communication with the optical sensor.

In some example approaches, the processor may be configured to establish a threshold amplitude for the received optical signal, wherein the processor establishes the fault in the paint system based upon a comparison of a received amplitude of the received optical signal with the threshold amplitude.

In some examples, the processor is configured to establish the presence of the fault based upon a reduction in amplitude of the received optical signal compared with the optical signal transmitted through the first optical conduit.

In at least some of the example approaches, the fluid supply line is one of an isolation line or a paint line.

Example methods for a painting system may include providing an applicator configured to apply paint to a series of objects from one of a plurality of paint valves, the plurality of paint valves comprising different paint colors to be applied by the applicator. Example methods may also include establishing an isolation line configured to supply a current selected color paint to the applicator, the isolation line comprising an outer wall formed of a material, the material being at least partially transparent such that light is permitted to be transmitted through the outer wall. These methods may also include transmitting an optical signal through the outer wall via a first optical conduit, generating a reflected optical signal in a second optical conduit by passing the optical signal through the isolation line, and receiving the reflected optical signal from the second optical conduit at an optical sensor. These methods may also include determining a presence of a previous color paint in the isolation line based upon a comparison of the received optical signal with the optical signal transmitted through the first optical conduit.

In some example methods, the presence of the previous color paint is determined based upon a diminished intensity of the received optical signal established from the comparison of the optical signal with the received optical signal.

In at least some examples, at least one of the first and second optical conduits employed in the method is a fiber optic cable.

In some example approaches, a method may further include establishing a threshold amplitude for the received optical signal based upon a baseline amplitude established from a cleaned isolation line of the painting system, wherein the presence of the previous color paint is established based upon a comparison of a received amplitude of the received optical signal with the threshold amplitude.

In some example methods, a processor is provided which is configured to establish the presence of the previous color paint based upon a reduction in amplitude of the received optical signal compared with the optical signal transmitted through the first optical conduit.

BRIEF DESCRIPTION OF THE DRAWINGS

One or more embodiments of the invention will hereinafter be described in conjunction with the appended drawings, wherein like designations denote like elements, and wherein:

FIG. 3 is a process flow diagram for a method of applying paint to a series of objects where different colors may be applied to different objects, according to one example.

DETAILED DESCRIPTION

Figure 1:
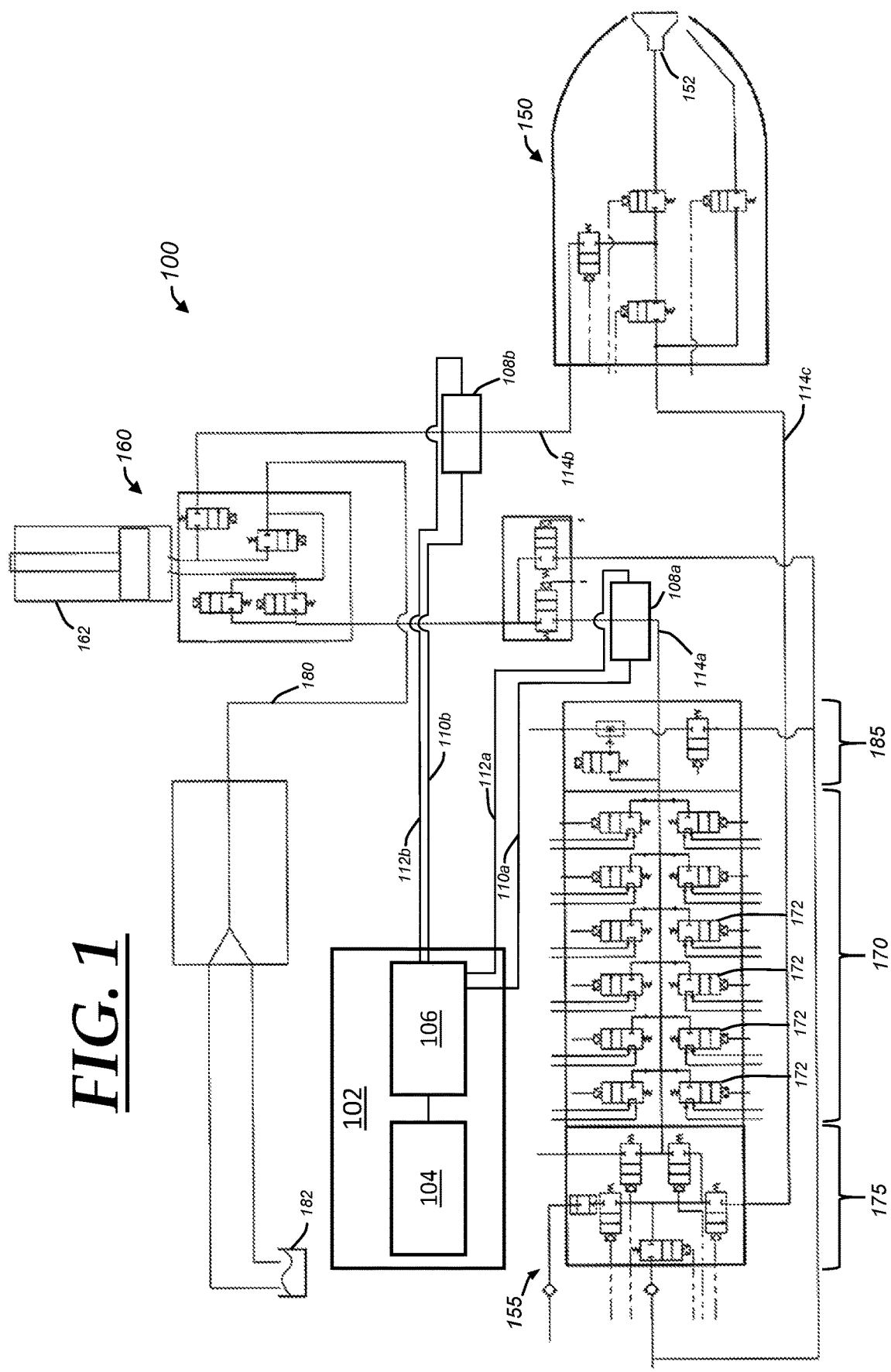
FIG. 1 is a schematic illustration of a painting system, e.g., for applying different color paints to a vehicle, according to one example approach.

Generally, example illustrations may employ an optical sensing assembly to detect a presence of a fault such as a contaminant, air bubble, or other undesired substance in a painting system. For example, an optical signal, e.g., light beam(s), may be transmitted through a line in a painting system, e.g., a hose or other conduit for paint or solvent. The optical signal may be transmitted through the contents of the hose, e.g., paint, solvent, or the like. A diminishing of the optical signal, e.g., a reduced amplitude, may indicate the presence of paint, undesired particles, air bubbles, etc., thereby facilitating detection of inadequate flushing of the line of the painting system, or inadequate pressurization of the line. Example methods disclosed herein may apply this principle to detect paint remaining in a hose after a cleaning process, thereby providing an indication of inadequate cleaning. In other example approaches, a method may determine a presence of air bubbles in a painting line, thereby providing an indication of inadequate charging or pressurization of a painting line. Example systems and methods may thus generally provide a fault detection system for error proofing a paint system color change cycle or paint application process, thereby reducing or preventing color contamination, and ensuring proper paint application.

In some example approaches, a fiber optic sensor and amplifier may be employed in a paint application system in order to error proof the color change cycles and paint application.

In the example of color change error-proofing, a color change cycle may initially clean or flush a line, such as a hose or conduit of a paint used to supply paint or other liquid as part of a painting process. An optical signal may then be transmitted through a portion of the line. The fiber optic sensor and amplifier may detect a diminished intensity of the optical signal, e.g., a reduction in amplitude, thereby indicating a presence of paint remaining in the line. Accordingly, the hose may be cleaned or flushed again in an effort to remove the paint remaining in the hose.

In an example of paint application error-proofing, a painting process may initially involve filling or charging a paint hose/conduit with a paint. An optical signal may subsequently be transmitted through the hose and the paint contained therein. It may be expected that the presence of paint will reduce an intensity, e.g., an amplitude, of the optical signal. To the extent the diminishing effect of the paint on the signal is reduced, this may indicate a presence of air bubbles in the hose. In other words, a signal intensity or amplitude of the optical signal above a given threshold may indicate a presence or air bubbles in the paint within the line. The air bubbles may result from inadequate charging/pressurization of the hose. Accordingly, corrective action may be taken, e.g., by increasing pressure in the paint hose, by re-pressurizing the hose, or the like. Accordingly, example approaches may use the optical signal to reduce incidents of paint defects, as may be otherwise caused by air bubbles and/or inadequate charging of a paint hose or conduit.

Turning now to FIG. 1, a schematic illustration of an example painting system 100 is shown. Generally, the system 100 may have an applicator assembly 150 configured to apply paint to an object, e.g., a vehicle (not shown). For example, the applicator assembly 150 may apply one or more paint colors using a rotary bell applicator 152.

The paint system 100 may further include a canister assembly 160 configured to control application of a given color paint, e.g., by way of a pressure ram 162 which provides a desired pressure within hoses or lines of the system 100 and provides a supply of paint to the applicator 152. The canister assembly 160 may be in communication with the applicator assembly 150 by way of a paint line 114*b*, as will be discussed further below.

The paint system 100 may also include a paint color valve assembly 170 in communication with the canister assembly 160. The paint color valve assembly 170 may be configured to supply a plurality of different color paints to the applicator assembly 150. For example, as illustrated the paint color valve assembly 170 may include a plurality of different paint valves 172. Each of the valves 172 may supply a different color paint, respectively, to the canister assembly 160 and/or applicator assembly 150. As will be discussed further below, a selected valve 172 may supply its respective paint to the canister assembly 160 by way of isolation line 114*a*.

A color changing manifold assembly 155 may also be provided, which generally facilitates selection and changing of different color paints to be applied by the applicator assembly 150. For example, as illustrated in FIG. 1, color changing manifold assembly 155 may include a solvent assembly 175, a color valve manifold 170, and a vacuum manifold 185. The solvent assembly 175 may generally be configured to provide a cleaning solvent, water, or the like to various components of system 100 as part of a color changing process. For example, in order to change between the different color paints being applied by way of the applicator assembly 150, it may be necessary to remove all traces of a paint from applicating components such as the applicator 152. Accordingly, a cleaning or color change process may be needed to generally flush or clean out a previous color paint from components of the system 100, in an effort to avoid contamination of a subsequent color paint with traces of the previous color paint. As will be discussed further below, the solvent assembly 175 may be in communication with the canister assembly 160 via the isolation line 114a, and may also be in communication with the applicator assembly 150 via a wash line 114c. The vacuum manifold 185 may generally provide a vacuum or suction within the lines of the color changing manifold assembly 155 and/or other components of the painting system 100, as may be useful for emptying lines of paint or solvent, or for forcing flow of paint, solvent, or air in a desired direction or manner within the painting system 100.

The system 100 may further include an apparatus for removing paint, solvent, etc. from the system 100. For example, a dump line 180 may be provided which is generally configured to provide an outlet for used solvent, paint, etc. to a recovery/waste port 182. The dump line 180 may be in communication with any components of the system 100 that is convenient for accomplishing this task, e.g., the canister assembly 160.

Each of the applicator assembly 150, canister assembly 160, color assembly 170, solvent assembly 175, and dump line 180 may include valves, conduits, one-way valves, vacuum lines, or any other components configured to facilitate fluid flow and/or fluid communication within the painting system 100.

As illustrated in FIG. 1, the paint system may include a process controller 102 comprising an input module rack 104. The process controller 102 may include at least a processor and a computer-readable memory, e.g., a non-transitory computer-readable memory. The memory may include instructions that, when executed by the processor, are configured to control any of the components of the system 100. The process controller 102 may thereby generally facilitate or control actuation of various subsystems of the paint system 100 and components thereof, e.g., applicator assembly 150, canister assembly 160, color assembly 170, solvent assembly 175, valves, etc. The process controller 102 may also facilitate detection of contaminants, air bubbles, or other undesired aspects of the system 100 using an optical sensing assembly/assemblies 108 and fiber optic amplifier 106, as will be described further below. The input module rack 104 may generally facilitate installation and service of various modules or components of the system 100, e.g., the applicator assembly 150, canister assembly 160, etc., merely as examples.

The painting system 100, as noted above, may be configured to check for the presence of contaminants or other undesired materials in the system 100, which may otherwise cause defects in applied paint. The system 100 may include, for example, optical sensor assemblies 108a and 108b (collectively, 108). The optical sensor assemblies 108 may be in communication with the controller 102, and in particular with amplifier 106. The amplifier 106 may generally facilitate output and/or analysis of optical signals by the controller 102 sent to/from the optical sensor assemblies 108. In some cases, the amplifier 106 may also facilitate conversion of optical signals to/from electrical signals as part of the analysis of the signals performed by the controller 102. The amplifier 106 may be contained within an enclosure of the controller 102 and/or the input module rack 104. In one example, optical sensing assemblies 108 may employ a fiber optic head sensor, such as the fiber optic head sensor PDI46U-LLD and liquid level sensing tube mount sold commercially by Banner Engineering of Minneapolis, Minn. In this example, the fiber optic amplifier may be the Banner Long Range Fiber amplifier DF-G3-PI-Q5, with a DC analog output of zero (0) to ten (10) Volts, and connected to the fiber optic head sensor. As will be discussed further below, the optical sensing assemblies 108 and amplifier 106 may be connected with any optical medium that is convenient, e.g., fiber optic cable.

As shown in FIG. 1, a first optical sensor assembly 108a is provided adjacent isolation line 114a, and a second optical sensor assembly 108b is provided adjacent paint line 114b. In this manner, the system 100 and controller 102 may be configured to analyze the contents of the isolation line 114a and paint line 114b. However, there is generally no limitation on how many optical sensor assemblies 108 may be provided within system 100. Moreover, the optical sensor assemblies 108 may be installed anywhere within the system 100 where it may be convenient to facilitate error-proofing or analysis consistent with the discussion below. Thus, optical sensor assemblies may be installed anywhere else within the system 100 where it may be convenient.

The optical sensor assemblies 108 may be each be in communication with the controller 102 and/or the amplifier 106 by way of first/transmitting optical conduits 110a and 110b (collectively, 110), and by way of second/receiving optical conduits 112a and 112b (collectively, 112). More specifically, as illustrated in FIG. 1, amplifier 106 may output an optical signal to the optical sensor assemblies 108a and 108b using the first optical conduits 110a, 110b, respectively. Amplifier 106 may receive return optical signals from the optical sensor assemblies 108a and 108b by way of the second optical conduits 112a, 112b, respectively. The optical conduits 110 and 112 may each comprise any conduit, cable, or line configured to transmit optical signals, e.g., one or more fiber optic cables, merely as examples.

As mentioned above, example apparatuses/methods employed in the context of the painting system 100 may help identify faults in the system 100, e.g., due to stuck/damaged valves. These faults may generally cause the presence of paint, air bubbles, or other undesired elements which may result in defects in applied paint if not corrected.

Figure 2:
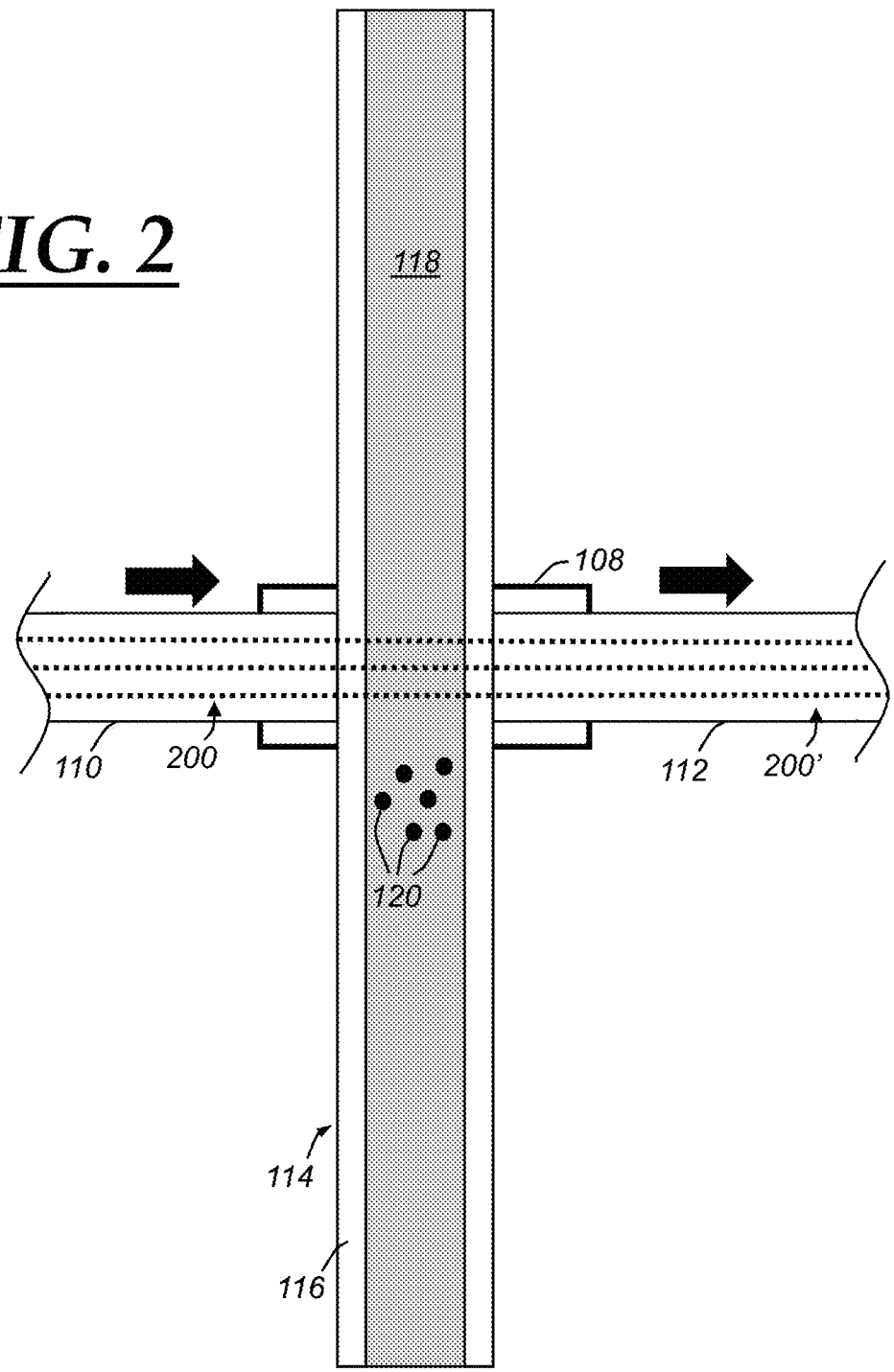
FIG. 2 is a partial section view of an example optical sensing assembly for use in the system of FIG. 1, according to an example.

Turning now to FIG. 2, operation of the optical sensor assemblies 108 is described in further detail, in accordance with several example illustrations. It should be noted that the illustration in FIG. 2 may be applied in the context of analysis of the isolation line 114a, the paint line 114b, or anywhere else in system 100 where it may be convenient to provide an optical sensor assembly 108.

Generally, an optical signal 200 may be transmitted via the first optical conduit 110 to a given hose, conduit, or line 114 of the system 100. The line 114 may have an outer wall 116 which is formed of a material that is at least partially transparent, such that an optical signal 200 (represented schematically by dashed lines in FIG. 2) may be passed through the outer wall 116 of the line 114. Merely as one example, the outer wall 116 may be formed of a substantially transparent plastic or flexible hose. The entire line 114 may be formed of the same material; alternatively, only a portion of the line 114 may be provided with an outer wall 116 that is at least partially transparent. The line 114 may be filled with a medium 118, which may be paint, a solvent, or air, as will be discussed below in more detailed examples. One or more undesired elements or objects 120 may be present in the medium 118, which may cause a fault in the painting system 100. By transmitting the optical signal 200 through the medium 118 contained in the line 114, a reflected or return optical signal 200' may be generated, which is then transmitted via the second optical conduit 112 (to amplifier 106, for example). The presence of any undesired elements 120 in the line 114 may be revealed by the effect the undesired elements 120 may have upon the optical signal 200. Accordingly, analysis of the return optical signal 200' (e.g., comparison with the transmitted optical signal 200) may determine a presence of any undesired elements 120 in the line, and/or an extent or amount of the undesired elements 120 in the medium 118. These undesired elements 120, as will be discussed further below, may include a previous color paint not adequately flushed from the system 100, dirt or other contaminants, or even air bubbles present in a current color paint being applied.

More specifically, as noted above an example optical sensor assembly 108a may be used to determine a presence of a previous color paint in isolation line 114a. Upon conclusion of applying a first color paint, it may be necessary to flush or clean the paint (supplied by a selected valve 172) from the isolation line 114a prior to using a different color paint. After flushing or cleaning the isolation line 114a, an optical signal 200 may be transmitted via the first optical conduit 110a to the optical sensor assembly 108a. The isolation line 114a may, at this point, be generally empty, such that the medium 118 therein is air. An undesired element 120 in this context, therefore, may be particles of the previous color paint remaining in the isolation line 114a, i.e., which were not adequately flushed or removed from the system 100. The remaining paint 120 may be detected by the effect of the paint 120 upon the optical signal 200, resulting in a return signal 200'. Generally, the paint 120 may diminish the signal 200 as it passes through the line 114. The diminishing of the signal may be a diminishing of the signal intensity, resulting in a relatively smaller amplitude in the return signal 200' as compared with the transmitted signal 200.

Accordingly, in some example approaches, a presence of the paint 120 may be determined from a relatively smaller amplitude of the return signal 200' in comparison to the transmitted signal 200. A degree to which the return signal 200' is diminished in intensity compared with the transmitted signal 200 may be compared with a threshold difference to determine whether any traces of paint 120 remain in the line 114, e.g., after the line 114 is flushed or cleaned as part of a color change process of the paint system 100. A threshold difference in the optical signal 200 and return signal 200' may be used to determine a presence of an undesired element such as the paint particles 120. In one example, an initial signal 200 having an amplitude of 5345 nanometers (nm) may observe a diminishing of the return signal amplitude to 30 nanometers (nm) when paint traces 120 are present in the line 114. In another example, a threshold of 2703 nm may be used to determine whether paint traces are present in the line 114. In other words, the line 114 may be determined to be substantially free of paint traces after a color change operation so long as the intensity of the return signal 200' is at least 2703 nm (or greater). Any threshold may be used that is convenient. As will be described further below, where the return signal 200' is observed to be below a given threshold, e.g., 2703 nm, a cleaning or flushing operation of the line 114 may be repeated as many times as are necessary to bring the signal intensity of the return signal 200' above the relevant threshold.

In another example of using an optical sensing assembly 108 in system 100 noted above, inadequate pressurization of a line in the system 100, e.g., paint line 114b, may result in a presence of air bubble(s) in the paint within the line. After paint line 114b is filled with paint to be applied to an object by way of the applicator assembly 150, optical sensing assembly 108b may be used to determine whether air bubbles are present in the paint. In the example illustrated in FIG. 2, for example, the line 114 may be filled with the medium 118, in this case a current color paint (to be applied by the applicator assembly 150). Before proceeding with applying the paint 118, the controller 102 may initiate an optical signal 200, which is passed through the line 114b containing the paint 118. The return signal 200' may be compared with the transmitted signal 200 to determine whether the paint line 114b is adequately pressurized. It is desired to eliminate to the extent possible the presence of air bubbles (i.e., the undesired element 120 illustrated in FIG. 2 in this example) in the paint 118. If the paint line 114b is adequately filled with the (generally opaque) paint 118 and minimal air bubbles 120 are present, a baseline threshold amount of diminishing of the signal 200 may be met. If, on the other hand, the return signal 200' is not sufficiently diminished, this may indicate the presence of air bubbles 120 (i.e., a lack of enough of the relatively opaque paint to diminish the optical signal 200 sufficiently below a threshold amount). In other words, the generally clear air bubbles 120 may result in a smaller diminishing effect of the paint 118 on the transmitted signal 200. As such, a smaller diminishing effect on the signal 200, as determined from a comparison to the return signal 200', may indicate inadequate pressurization or charging of the paint line 114b. As different color paints may have different effects on the signal 200, it may be desirable to establish different thresholds to be used as the basis for determining a presence or lack of air bubbles in the paint 118. It should be noted that if a given paint color is particularly dark or opaque, a diminishing effect of the paint 118 may be so great even with the presence of air bubbles that a sufficient difference may not be observable.

Turning now to FIG. 3, an example process flow diagram is illustrated for a process 300 of applying paints to objects, e.g., vehicles, where different color paints are applied to different vehicles or groups of vehicles. Process 300 may begin at block 305, where the painting system 100 may be prepared to apply paint to a vehicle or group of vehicles in a given color. For example, the paint line 114b may be generally filled and/or pressurized with paint.

Proceeding to block 310, process 300 may initiate an optical signal 200 to optical sensor assembly 108b. Process 300 may then proceed to block 315.

At block 315, process 300 may generally determine whether the pressurization of the paint line 114b is sufficient based upon the optical signal 200 transmitted in block 310. For example, as discussed above, a presence of air bubbles may be determined if a diminishing or attenuation of the optical signal 200 is less than expected (e.g., an amplitude of the return signal 200' exceeds a predetermined threshold). Accordingly, process 300 may query whether the return signal 200' received at the amplifier 106 is relatively high, e.g., by exceeding a predetermined threshold signal strength or intensity. In one example, a threshold amplitude of the return signal 200' may be determined by measuring an attenuation of a signal 200 based upon an adequately pressurized paint line 114b. If, at block 315, process 300 determines that the strength of the return signal 200' exceeds a threshold amount (i.e., the paint line 114b is not properly pressurized or filled with paint), process 300 may proceed to block 320. At block 320, corrective action with respect to the air bubbles in the paint line 114b may be taken. For example, the paint line 114b may be re-pressurized or refilled in an effort to increase the filling of the paint line 114b and/or reduce the amount of air bubbles present in the paint line 114b. Process 300 may then proceed back to block 310, where another optical signal 200 is generated, and process 300 analyzes the paint line 114b again at block 315. On the other hand, if process 300 determines that the strength of the return signal 200' does not exceed the threshold amount (i.e., the paint line 114b is properly pressurized or filled with paint), process 300 may proceed to block 325.

At block 325, paint may be applied to one or more objects, e.g., by way of the applicator assembly 150. Upon completion of the application of the paint to the object(s) in the current color, process 300 may proceed to block 330.

At block 330, process 300 may query whether a color change is desired. If a color change is not desired (i.e., a next object to be painted will be painted the same color as is currently being applied by the system 100), process 300 may proceed back to block 310. Accordingly, process 300 may check for adequate pressurization of the paint line 114b at blocks 310 and 315 as discussed above.

If, on the other hand, a color change is desired, process 300 may proceed to block 335. At block 335, a color change or flushing of any components of the system 100 that is desired may be undertaken. Generally, any components of the system 100 coming into contact with the paint during application are desired to be cleaned or flushed of the paint before initiating painting in a different color, thereby preventing mixing of the different color paints. As noted above, one of the components to be cleaned may include the isolation line 114a, although example optical sensing assemblies 108 may be applied anywhere else in the system 100 that is convenient.

After the isolation line 114a and/or other relevant component(s) of the painting system 100 are cleaned or flushed, process 300 may determine whether the component(s) has/have been adequately cleaned or flushed of substantially all traces of the previous color paint. For example, as discussed above, an optical signal 200 may be initiated and compared with a return signal 200' created by transmitting the optical signal through the relevant component, such as the isolation line 114a. Accordingly, at block 340, process 300 may initiate an optical signal 200 to optical sensing assembly 108a adjacent the isolation line 114a. Process 300 may then proceed to block 345.

As discussed above, where the return signal 200' drops below a threshold signal intensity or strength, e.g., as determined from the amplitude of the return signal 200', this may indicate a presence of paint drops or traces in the isolation line 114a. Process 300 may therefore, at block 345, query whether the return signal 200' is below a relevant predetermined threshold strength or intensity. If, for example, the amplitude of the return signal 200' is below a threshold amount, process 300 may proceed to block 335, where further cleaning step(s) may be initiated of the relevant component(s) of the painting system 100, e.g., the isolation line 114a, in an effort to remove any remaining paint drops or traces in the system 100. If, on the other hand, process 300 determines at block 345 that the return signal 200' exceeds the relevant signal strength threshold, e.g., a predetermined amplitude, process 300 may instead proceed back to block 305. Accordingly, process 300 may then continue with pressurizing the paint line 114b, determining adequacy of the pressurization/lack of air bubbles, and apply the paint to the next object at blocks 305-325. Process 300 may continue until any object(s) to be painted are completed.

The optical sensing assemblies or apparatuses in the foregoing example system 100 and process 300 may generally facilitate reduction or elimination of painting defects due to inadequate cleaning or pressurization of relevant components of the system 100. More specifically, predetermined thresholds may be used as references to determine, based upon an effect of a measured component such as a painting line or isolation line in the system 100 on an optical signal 200, whether a fault is present such as an undesired contaminant, trace(s) of a previous paint color, or air bubbles which may otherwise cause defects in applied paint. Accordingly, corrective action may be taken to reduce instances or prevent entirely the occurrence of these defects.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An apparatus for detecting a fault in a painting system having an applicator configured to apply paint to a series of objects and a paint block assembly configured to receive a plurality of paint valves corresponding to different paint colors applied by the applicator, the apparatus comprising:
   an isolation line configured to supply a current selected color paint to the applicator, the isolation line comprising an outer wall formed of a material, the material being at least partially transparent such that light is permitted to be transmitted through the outer wall;
   a first optical conduit configured to transmit a first optical signal defining a first intensity to pass through the isolation line;
   a second optical conduit configured to receive a second optical signal passing through the isolation line, the second optical signal having a second intensity;
   an optical sensor in communication with the second optical conduit such that the optical sensor is configured to receive the first optical signal and the second optical signal; and
   a processor in communication with the optical sensor, the processor configured to detect a previous color paint in the isolation line based upon a comparison of the first optical signal and the second optical signal to determine a difference between the first intensity and the second intensity.

2. The apparatus of claim 1, wherein the processor is configured to detect the previous color paint based upon a diminished intensity of the second optical signal established from the comparison of the first optical signal with the second optical signal.

3. The apparatus of claim 1, wherein at least one of the first and second optical conduits is a fiber optic cable.

4. The apparatus of claim 1, further comprising a signal amplifier in communication with the optical sensor.

5. The apparatus of claim 4, wherein the processor is configured to establish a threshold amplitude for the second optical signal, wherein the processor establishes the presence of the previous color paint based upon a comparison of a second amplitude of the second optical signal with the threshold amplitude.

6. The apparatus of claim 4, wherein the processor is configured to establish the presence of the previous color paint based upon a reduction in amplitude of the second optical signal compared with the first optical signal.

7. An apparatus for detecting a fault in a painting system having an applicator configured to apply at least two different color paints to objects, the apparatus comprising:
a fluid supply line configured to supply one of a paint and a solvent to the applicator, the fluid supply line comprising an outer wall formed of a material, the material being at least partially transparent such that light is permitted to be transmitted through the outer wall;
a first optical conduit configured to transmit a first optical signal defining a first intensity to pass through the isolation line;
a second optical conduit configured to receive a second optical signal passing through the isolation line, the second optical signal having a second intensity;
an optical sensor in communication with the second optical conduit such that the optical sensor is configured to receive the first optical signal and the second optical signal; and
a processor in communication with the optical sensor, the processor configured to detect a fault in the fluid supply line based upon a comparison of the first optical signal and the second optical signal to determine a difference between the first intensity and the second intensity.

8. The apparatus of claim 7, wherein the processor is configured to detect the fault based upon the difference between the first intensity and the second intensity.

9. The apparatus of claim 7, wherein the processor is configured to detect the fault based upon an intensity of the second optical signal exceeding a threshold intensity.

10. The apparatus of claim 7, wherein the fault includes a presence of one of (a) a previous paint circulated in the fluid supply line, or (b) air in a current paint in the fluid supply line.

11. The apparatus of claim 7, wherein at least one of the first and second optical conduits is a fiber optic cable.

12. The apparatus of claim 7, further comprising a signal amplifier in communication with the optical sensor.

13. The apparatus of claim 11, wherein the processor is configured to establish a threshold amplitude for the second optical signal, wherein the processor establishes the fault in the paint system based upon a comparison of a second amplitude of the second optical signal with the threshold amplitude.

14. The apparatus of claim 13, wherein the processor is configured to establish the presence of the fault based upon a reduction in amplitude of the second optical signal compared with the first optical signal.

15. The apparatus of claim 7, wherein the fluid supply line is one of an isolation line or a paint line.

16. A method for a painting system, comprising:
providing an applicator configured to apply paint to a series of objects from one of a plurality of paint valves, the plurality of paint valves comprising different paint colors to be applied by the applicator;
establishing an isolation line configured to supply a current selected color paint to the applicator, the isolation line comprising an outer wall formed of a material, the material being at least partially transparent such that light is permitted to be transmitted through the outer wall;
transmitting a first optical signal defining a first intensity to pass through the isolation line via a first optical conduit;
passing a second optical signal through the isolation line in a second optical conduit, the second optical signal having a second intensity;
receiving the first optical signal and the second optical signal; and
determining a presence of a previous color paint in the isolation line based upon a comparison of the first optical signal and the second optical signal to determine a difference between the first intensity and the second intensity.

17. The method of claim 16, wherein the presence of the previous color paint is determined based upon the difference between the first intensity and the second intensity.

18. The method of claim 16, further comprising establishing at least one of the first and second optical conduits as a fiber optic cable.

19. The method of claim 16, further comprising establishing a threshold amplitude for the second optical signal based upon a baseline amplitude established from a cleaned isolation line of the painting system, wherein the presence of the previous color paint is established based upon a comparison of a second amplitude of the second optical signal with the threshold amplitude.

20. The method of claim 16, wherein the presence of the previous color paint is determined based upon a reduction in amplitude of the second optical signal compared with the first optical signal.

* * * * *